United States Patent
Verma et al.

(10) Patent No.: US 11,209,106 B2
(45) Date of Patent: Dec. 28, 2021

(54) SELF-LOCKING FLUID COUPLING ASSEMBLY

(71) Applicant: General Electric Company, Schenectady, NY (US)

(72) Inventors: Naleen Kumar Verma, Bangalore (IN); Daniel Drew Smith, Mason, OH (US); Dharmaraj Pachaiappan, Bangalore (IN)

(73) Assignee: GENERAL ELECTRIC COMPANY, Schenectady, NY (US)

(*) Notice: Subject to any disclaimer, the term of this patent is extended or adjusted under 35 U.S.C. 154(b) by 326 days.

(21) Appl. No.: 16/361,786

(22) Filed: Mar. 22, 2019

(65) Prior Publication Data

US 2020/0300390 A1  Sep. 24, 2020

(51) Int. Cl.
*F16L 19/00* (2006.01)
*F16L 19/025* (2006.01)

(52) U.S. Cl.
CPC ........... *F16L 19/005* (2013.01); *F16L 19/025* (2013.01)

(58) Field of Classification Search
CPC .............................. F16L 19/005; F16L 19/025
(Continued)

(56) References Cited

U.S. PATENT DOCUMENTS 5,165,832 A  11/1992 Dimov
5,350,200 A   9/1994 Peterson et al.
(Continued)

FOREIGN PATENT DOCUMENTS

CN  1230651 A  10/1999
CN  101048614 A  10/2007
(Continued)

OTHER PUBLICATIONS

Parker-Hannifin Corporation, Nutlok Fittings, Nutlok Self Locking System Design Details pp. 4 & 5, Stratoflex Products Division, Jacksonville, Florida, 16 Pages. http://www.jointek.it/public/53/106-NUTLOK.pdf.
(Continued)

*Primary Examiner* — Aaron M Dunwoody
(74) *Attorney, Agent, or Firm* — Venable LLP; Michele V. Frank

(57) ABSTRACT

In one exemplary embodiment of the present disclosure a fluid coupling assembly defining an axial direction, a radial direction, and a circumferential direction is provided. The fluid coupling assembly includes a male coupling including a first MC attachment interface, a second MC attachment interface, and an outer surface extending along the circumferential direction; a ferrule coupling including an FC attachment interface pressed against the first MC attachment interface, a lip extending along the radial direction, and an outer surface extending along the circumferential direction to define a circular shape; and a nut coupling including an NC attachment interface rotatably engaged with the second MC attachment interface, a flange extending along the radial direction and pressed against the lip of the ferrule coupling, and an inner surface extending along the circumferential direction to define a circular shape; wherein the outer surface of the male coupling, the outer surface of the ferrule, or the inner surface of the nut coupling includes a plurality of non-resilient protrusions spaced along the circumferential direction for contacting an opposing surface and increasing a loosening resistance of the fluid coupling assembly.

18 Claims, 4 Drawing Sheets

(58) Field of Classification Search
USPC .................................................. 285/92, 81
See application file for complete search history.

(56) References Cited

U.S. PATENT DOCUMENTS

| | | |
|---|---|---|
| 5,388,866 A | 2/1995 | Schlosser |
| 5,758,910 A | 6/1998 | Barber et al. |
| 6,116,658 A * | 9/2000 | Bohlen ................ F16L 19/005 285/330 |
| 6,302,447 B1 | 10/2001 | Lee |
| 6,517,126 B1 | 2/2003 | Peterson et al. |
| 6,644,903 B1 | 11/2003 | Arand |
| 6,863,314 B2 | 3/2005 | Guest |
| 6,997,658 B2 | 2/2006 | Fly |
| 2007/0267869 A1 | 11/2007 | Patel |
| 2011/0278837 A1 | 11/2011 | Yamamoto et al. |
| 2018/0100610 A1 | 4/2018 | Patel et al. |

FOREIGN PATENT DOCUMENTS

| | | |
|---|---|---|
| CN | 203215125 U | 9/2013 |
| CN | 103339432 A | 10/2013 |
| CN | 203880267 U | 10/2014 |
| CN | 105164456 A | 12/2015 |

OTHER PUBLICATIONS

JPB Systeme, LULYLOK, One sided lockwireless antirotational design for Fluid Connection Fittings, France, Cincinnati, OH—USA, 13 Pages. http://www.jpb-systeme.com/Lulylok.php.

Shur-Lock, Lockwireless B-Nut a Game Changer, PCC Fasteners, Irvine, CA, 1 page. http://www.pccfasteners.com/news/lockwireless-b-nut-a-game-changer.html.

* cited by examiner

SELF-LOCKING FLUID COUPLING ASSEMBLY

FIELD

The present subject matter relates generally to a self-locking fluid coupling assembly for use in, e.g., aeronautical systems.

BACKGROUND

Many aeronautical systems utilize fluid for various purposes. For example, fuel systems deliver fuel to one or more gas turbine engines or other aeronautical engines. Further, hydraulic systems may deliver pressurized hydraulic fluid for, e.g., actuation of various components. Further, still, thermal management systems may circulate a thermal transfer fluid between various components for maintaining a temperature of such components within a desired operating temperature range. One or more of these systems may be critical to the operation of the aeronautical system. As such, it may be important to ensure that fluid couplings within such systems remain intact throughout operation.

With certain aeronautical systems, a safety wire may be utilized to reduce a probability of the fluid coupling assembly from becoming loose and leaking fluid or decoupling altogether. For example, fluid coupling assemblies including a tightening nut may utilize a safety wire fixed between the tightening nut and a component to which it is attached to resist a loosening of the tightening nut through operation.

However, attaching such a safety wire must generally be done manually, and therefore may be a time consuming process. Accordingly, a fluid coupling assembly having one or more features for increasing a loosening resistance of the assembly without requiring manual installation of a safety wire would be useful.

BRIEF DESCRIPTION

Aspects and advantages of the invention will be set forth in part in the following description, or may be obvious from the description, or may be learned through practice of the invention.

In one exemplary embodiment of the present disclosure a fluid coupling assembly defining an axial direction, a radial direction, and a circumferential direction is provided. The fluid coupling assembly includes a male coupling including a first MC attachment interface, a second MC attachment interface, and an outer surface extending along the circumferential direction; a ferrule coupling including an FC attachment interface pressed against the first MC attachment interface, a lip extending along the radial direction, and an outer surface extending along the circumferential direction to define a circular shape; and a nut coupling including an NC attachment interface rotatably engaged with the second MC attachment interface, a flange extending along the radial direction and pressed against the lip of the ferrule coupling, and an inner surface extending along the circumferential direction to define a circular shape; wherein the outer surface of the male coupling, the outer surface of the ferrule, or the inner surface of the nut coupling includes a plurality of non-resilient protrusions spaced along the circumferential direction for contacting an opposing surface and increasing a loosening resistance of the fluid coupling assembly.

In certain exemplary embodiments the plurality of protrusions is a plurality of substantially semi-spherical protrusions.

In certain exemplary embodiments the plurality of protrusions are positioned on the outer surface of the ferrule coupling and formed integrally with the outer surface of the ferrule coupling, and wherein the plurality of protrusions contact the inner surface of the nut coupling.

In certain exemplary embodiments the plurality of protrusions are positioned on the inner surface of the nut coupling and formed integrally with the inner surface of the nut coupling, and wherein the plurality of protrusions contact the outer surface of the ferrule coupling.

For example in certain exemplary embodiments the plurality of protrusions is a first plurality protrusions, and wherein the outer surface of the ferrule coupling includes a second plurality of protrusions formed integrally with the outer surface of the ferrule coupling and contacting the inner surface of the nut coupling.

In certain exemplary embodiments the outer surface of the ferrule coupling is a first outer surface positioned on one side of the lip along the axial direction, wherein the ferrule coupling further comprises a second outer surface positioned on an opposite side of the lip along the axial direction, wherein the inner surface of the nut coupling is a first inner surface positioned on one side of the flange along the axial direction, wherein the nut coupling further comprises a second inner surface positioned on an opposite side of the flange along the axial direction, and wherein the second outer surface of the ferrule coupling and the second inner surface of the nut coupling together form a serration assembly.

For example, in certain exemplary embodiments the second outer surface of the ferrule coupling comprises a first plurality of serration slopes, wherein the second inner surface of the nut coupling comprises a second plurality of serration slopes, and wherein the first plurality of serration slopes and the second plurality of serration slopes together form the serration assembly.

For example, in certain exemplary embodiments the second plurality of serration slopes is a continuous arrangement of serration slopes, and wherein the first plurality of serration slopes is a plurality of intermittent serration slopes spaced along the circumferential direction.

For example, in certain exemplary embodiments the NC attachment interface defines a first length along the axial direction, wherein the serration assembly defines a second length along the axial direction, and wherein the second length is about 20 percent or less of the first length.

In certain exemplary embodiments the NC attachment interface includes a plurality of threads, and wherein the second MC attachment interface includes a corresponding plurality of threads.

In certain exemplary embodiments the first MC attachment interface is an inwardly sloping surface, and wherein the FC attachment interface is an outwardly sloping surface.

In certain exemplary embodiments the plurality of protrusions includes at least five protrusions and up to 100 protrusions.

In certain exemplary embodiments the plurality of protrusions are positioned on the outer surface of the male coupling or the inner surface of the nut coupling, and wherein the outer surface of the male coupling is positioned adjacent to the inner surface of the nut coupling.

In certain exemplary embodiments the male coupling, the ferrule coupling, or the nut coupling is formed through an additive manufacturing process to include the plurality of protrusions.

In an exemplary embodiment of the present disclosure a fluid coupling assembly defining an axial direction, a radial direction, and a circumferential direction is provided. The fluid coupling assembly includes a male coupling including a first MC attachment interface, a second MC attachment interface, and an outer surface extending along the circumferential direction; a ferrule coupling including an FC attachment interface pressed against the first MC attachment interface, a lip extending along the radial direction, and an outer surface extending along the circumferential direction; and a nut coupling including an NC attachment interface rotatably engaged with the second MC attachment interface, a flange extending along the radial direction and pressed against the lip of the ferrule coupling, an inner surface, and a first plurality of non-resilient geometric members formed on the inner surface and spaced along the circumferential direction; wherein the outer surface of the male coupling or the outer surface of the ferrule includes a second plurality of non-resilient geometric members spaced along the circumferential direction for engaging the first plurality of protrusions and increasing a loosening resistance of the fluid coupling assembly.

In certain exemplary embodiments the first plurality of geometric members is a first plurality of serration slopes, wherein the second plurality of geometric members is a second plurality of serration slopes, and wherein the first plurality of serration slopes and the second plurality of serration slopes together form a serration assembly.

For example, in certain exemplary embodiments the second plurality of serration slopes is a continuous arrangement of serration slopes, and wherein the first plurality of serration slopes is a plurality of intermittent serration slopes spaced along the circumferential direction.

For example, in certain exemplary embodiments the NC attachment interface defines a first length along the axial direction, wherein the serration assembly defines a second length along the axial direction, and wherein the second length is about 20 percent or less of the first length.

In certain exemplary embodiments the first plurality of geometric members is a plurality of substantially semi-spherical protrusions, and wherein the second plurality of geometric members is also a plurality of substantially semi-spherical protrusions.

In an exemplary embodiment of the present disclosure, an aeronautical gas turbine engine includes a system utilizing a fluid, the system including a fluid coupling assembly for connecting a pair of fluid lines, the fluid coupling assembly defining an axial direction, a radial direction, and a circumferential direction and including a male coupling including a first MC attachment interface, a second MC attachment interface, and an outer surface extending along the circumferential direction; a ferrule coupling including an FC attachment interface pressed against the first MC attachment interface, a lip extending along the radial direction, and an outer surface extending along the circumferential direction to define a circular shape; and a nut coupling including an NC attachment interface rotatably engaged with the second MC attachment interface, a flange extending along the radial direction and pressed against the lip of the ferrule coupling, and an inner surface extending along the circumferential direction to define a circular shape; wherein the outer surface of the male coupling, the outer surface of the ferrule, or the inner surface of the nut coupling includes a plurality of non-resilient protrusions spaced along the circumferential direction for contacting an opposing surface and increasing a loosening resistance of the fluid coupling assembly.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
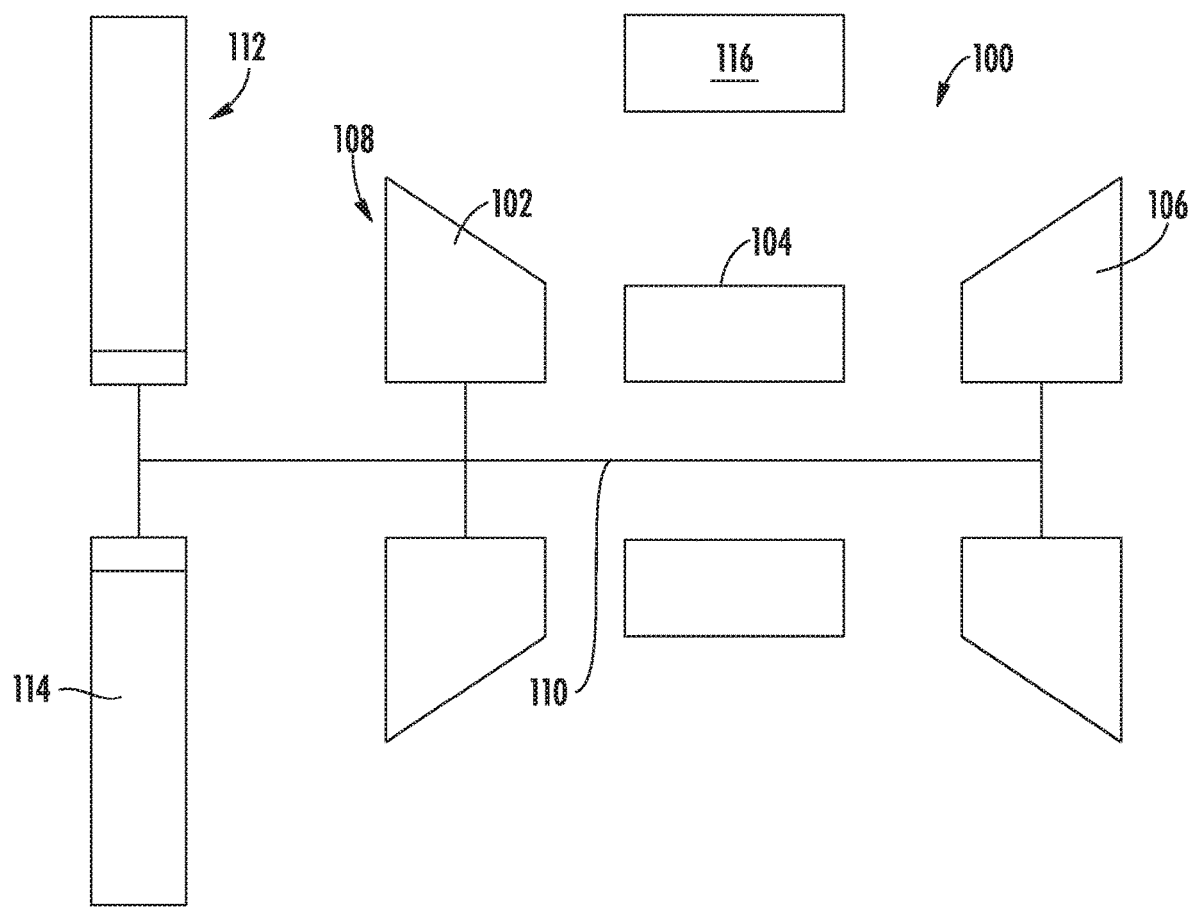
FIG. 1 is a schematic view of a gas turbine engine in accordance with an exemplary embodiment of the present disclosure.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

As used herein, the terms "first", "second", and "third" may be used interchangeably to distinguish one component from another and are not intended to signify location or importance of the individual components.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Referring now figures, FIG. 1 depicts an engine in accordance with an exemplary embodiment of the present disclosure. For the embodiment of FIG. 1, the engine is generally configured as a turbofan engine 100. More specifically, the turbofan engine 100 generally includes a compressor section 102, a combustion section 104, and a turbine section 106. The combustion section 104 is located downstream of the compressor section 102 and upstream of the turbine section 106. During operation, an airflow may be provided to an inlet 108 of the compressor section 102, wherein such airflow is compressed through one or more compressors, each of which may include one or more alternating stages of compressor rotor blades and compressor stator vanes. Compressed air from the compressor section 102 may then be provided to the combustion section 104, wherein the compressed air may be mixed with a fuel and ignited to generate combustion products. The combustion products may then flow to the turbine section 106 wherein one or more turbines may extract kinetic/rotational energy from the combustion products. As with the compressor(s) within the compressor section 102, each of the turbine(s) within the turbine section 106 may include one or more alternating stages of turbine rotor blades and turbine stator vanes. The combustion products may then flow from the turbine section 106 through, e.g., an exhaust nozzle (not shown) to generate thrust for the turbofan engine 100.

As will be appreciated, rotation of the turbine(s) within the turbine section 106, generated by the combustion products, is transferred through one or more shafts or spools 110 to drive the compressor(s) within the compressor section 102. Additionally, for the embodiment depicted, the turbofan engine 100 includes a fan section 112 at a forward end. The fan section 112 includes a fan 114 that is also driven by/rotatable by the turbine section 106. More specifically, for the embodiment depicted, the one or more shafts or spools 110 mechanically connects to the fan 114 of the fan section 112 for driving the fan 114 of the fan section 112.

Moreover, as is depicted schematically, the turbofan engine 100 includes one or more systems 116 which may utilize a fluid. For example, the one or more systems 116 depicted schematically may include a fuel delivery system for providing fuel to the combustion section 104 of the turbofan engine 100, a lubrication oil system for providing lubrication oil to one or more bearings supporting various rotating components of the turbofan engine 100, a hydraulic system for providing pressurized hydraulic fluid for actuating one or more components of the turbofan engine 100, etc. One or more these systems may utilize a fluid coupling assembly in accordance with one or more of the exemplary aspects discussed below.

It will be appreciated that the turbofan engine 100 depicted schematically in FIG. 1 is provided by way of example only. In certain exemplary embodiments, the turbofan engine 100 may include any suitable number of compressors within the compressor section 102, any suitable number of turbines within the turbine section 106, and further may include any number of shafts or spools 110 appropriate for mechanically linking the compressor(s), turbine(s), and/or fans (such as fan 114). Similarly, in other exemplary embodiments, the turbofan engine 100 may include any suitable fan section 112, with a fan 114 thereof being driven by the turbine section 106 in any suitable manner. For example, in certain embodiments, the fan 114 may be directly linked to a turbine within the turbine section 106, or alternatively, may be driven by a turbine within the turbine section 106 across a reduction gearbox. Additionally, the fan 114 may be a variable pitch fan, a fixed pitch fan, a ducted fan (i.e., the turbofan engine 100 may include an outer nacelle surrounding the fan section 112), an un-ducted fan, or may have any other suitable configuration. Further, it will be appreciated that the turbofan engine 102 may be an aeronautical turbofan engine coupled to, e.g., an airplane. However, in other embodiments, the turbofan engine 102 may instead be any other suitable type of gas turbine engine, such as an industrial gas turbine engine, an aero-derivative gas turbine engine, a turboprop engine, a turboshaft engine, a turbojet engine, etc.

Figure 2:
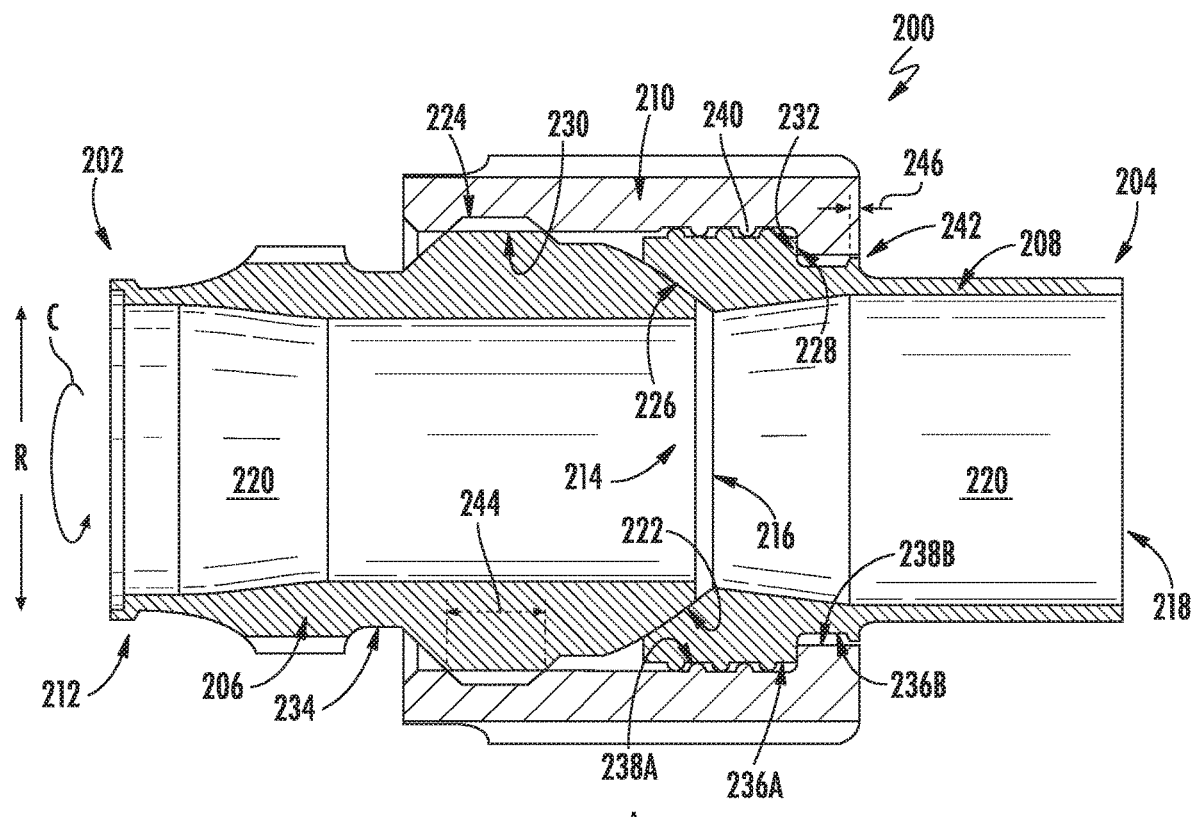
FIG. 2 is side, cross-sectional view of a fluid coupling assembly in accordance with an exemplary embodiment of the present disclosure.

Referring now to FIG. 2, a fluid coupling assembly 200 in accordance with an exemplary aspect of the present disclosure is depicted. The fluid coupling assembly 200 of FIG. 2 may be incorporated into a gas turbine engine, such as the exemplary turbofan engine 102 discussed above with reference to FIG. 1. Alternatively, however, the fluid coupling assembly 200 may be incorporated into, or utilized with, any other suitable system utilizing a fluid flow.

The fluid coupling assembly 200 defines an axial direction A, a radial direction R, and a circumferential direction C. Additionally, the fluid coupling assembly 200 generally extends between a first end and a second end along the axial direction A. For the purposes of explanation, the first end will generally be referred to as a forward end 202 and the second end will generally be referred to as an aft end 204. However, such designations should not be used to infer, e.g., a fluid flow direction through the fluid coupling assembly 200, an orientation during installation, etc.

The fluid coupling assembly 200 generally includes a male coupling 206, a ferrule coupling 208, and a nut coupling 210. The male coupling 206 extends between a forward end 212 and an aft end 214 generally along the axial direction A, and similarly the ferrule coupling 208 extends between a forward end 216 and an aft end 218 generally along the axial direction A. The forward end 212 of the male coupling 206 may be formed with, or otherwise coupled to, a first fluid line and the aft end 218 of the ferrule coupling 208 may be formed with, or otherwise coupled to, a second fluid line. The male coupling 206 and ferrule coupling 208 together define a fluid flow passage 220 extending therethrough, and the fluid coupling assembly 200 generally provides for a fluid tight connection between the first fluid line and the second fluid line by way of the fluid flow passage 220.

For the embodiment shown, the male coupling 206 generally includes a first male coupling ("MC") attachment interface 222 and a second MC attachment interface 224; the ferrule coupling 208 includes a ferrule coupling ("FC") attachment interface 226 pressed against the first MC attachment interface 222, and a lip 228 extending along the radial direction R (and circumferential direction C; see FIG. 4); and the nut coupling 210 includes a nut coupling ("NC") attachment interface 230 rotatably engaged with the second MC attachment interface 224, and a flange 232 extending along the radial direction R (and along the circumferential direction C) and pressed against the lip 228 of the ferrule coupling 208. More specifically, for the embodiment shown, the NC attachment interface 230 is a plurality of threads and the second MC attachment interface 224 is a corresponding plurality of threads, and further for the embodiment shown, the first MC attachment interface 222 is an inwardly sloping surface (i.e., sloping inwardly along the radial direction R as it extends towards the ferrule coupling 208) and the FC attachment interface 226 is an outwardly sloping surface (i.e., sloping outwardly along the radial direction R as it extends towards the male coupling 206). In such a manner, it will be appreciated that as the nut coupling 210 is tightened on the male coupling 206, through the NC attachment interface 230 and second MC attachment interface 224, the flange 232 of the nut coupling 210 presses against the lip 228 of the ferrule coupling 208, further pressing the FC attachment interface 226 against the first MC attachment interface 222 to form a fluid tight seal between the FC attachment interface 226 and first MC attachment interface 222.

Further, it will be appreciated that for the embodiment shown, the fluid coupling assembly 200 includes features for increasing a loosening resistance of the fluid coupling assembly 200. For the embodiment shown, the loosening resistance refers to a resistance on the nut coupling 210 from turning in a circumferential direction C that would lessen a contact pressure between the FC attachment interface 226 and first MC attachment interface 222, therefore reducing the ability of such components to form a fluid tight seal therebetween. For example, if the fluid coupling assembly 200 is configured such that rotation of the nut coupling 210 relative to the male coupling 206 in a first circumferential direction C increases the contact pressure between the FC attachment interface 226 and first MC attachment interface 222, then the loosening resistance refers to a resistance on the nut coupling 210 from moving in a second circumferential direction C (opposite the first circumferential direction C) relative to the male coupling 206.

Figure 4:
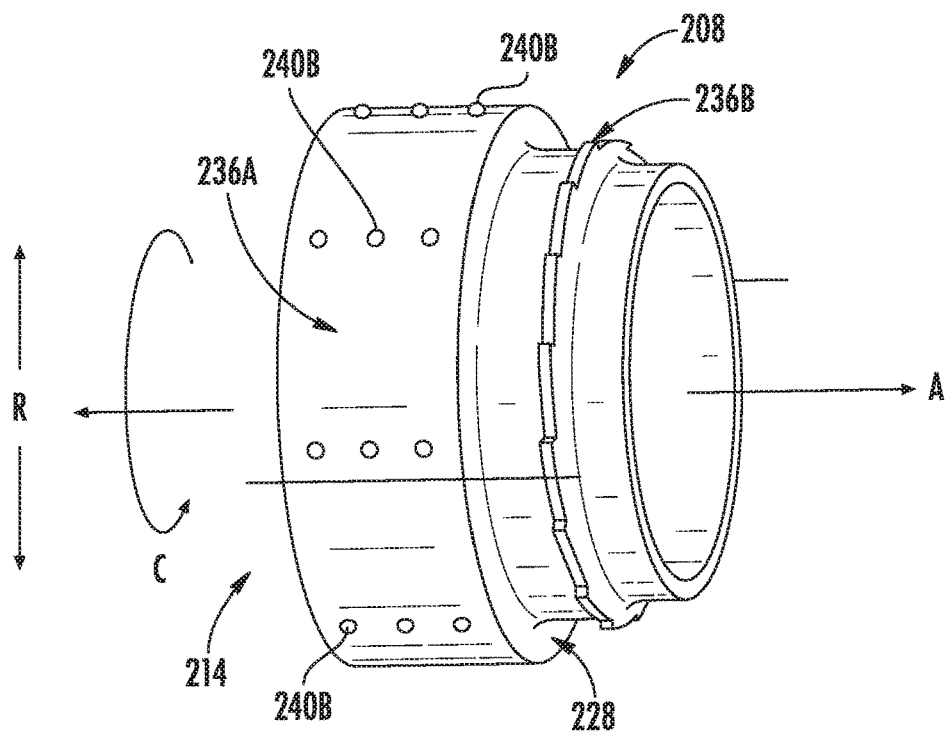
FIG. 4 is a perspective view of the ferrule coupling of the fluid coupling assembly of FIG. 2.
Figure 5:
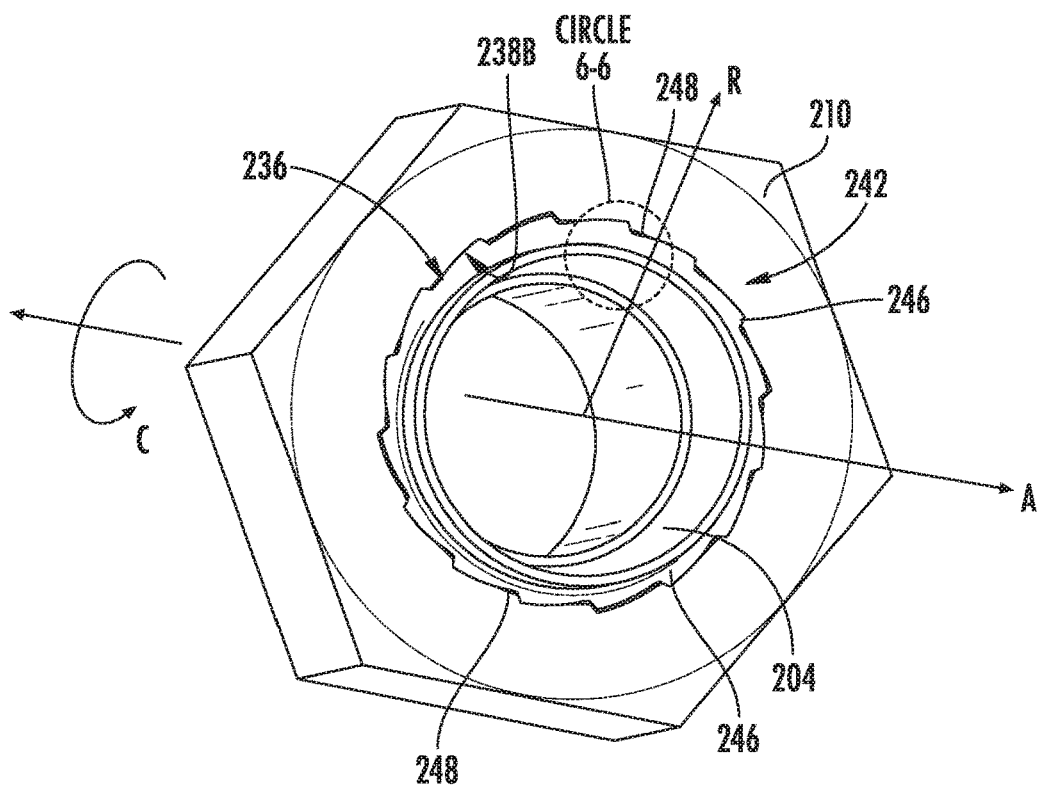
FIG. 5 is a perspective, end view of the nut coupling and fluid coupling assembly of FIG. 2.

More specifically, it will be appreciated that for the embodiment shown, the male coupling 206 further includes an outer surface 234 extending along the circumferential direction C, the ferrule coupling 208 includes an outer surface 236 extending along the circumferential direction C to define a circular shape (see also, FIG. 4, discussed below), and the nut coupling 210 includes an inner surface 238 extending along the circumferential direction C to define a circular shape (see generally FIG. 5, discussed below). For the embodiment shown, the inner surface 238 of the nut coupling 210 is positioned adjacent to the outer surface 236 of the ferrule coupling 208. The outer surface 234 of the male coupling 206, the outer surface 236 of the ferrule coupling 208, or the inner surface 238 of the nut coupling 210 includes a plurality of protrusions 240 spaced along the circumferential direction C for increasing a loosening resistance of the fluid coupling assembly 200.

Notably, in at least certain exemplary embodiments, such as the embodiment shown, the protrusions 240 may be integrally formed protrusions (i.e., formed integrally with the surface of the component including the protrusions 240). For example, the component including the protrusions 240 may be formed through an additive manufacturing process, such that the component and the protrusions 240 are formed as a single piece, with the surface on which the protrusions are positioned having a circular shape with the exception of the protrusions 240. Alternatively, the protrusions 240 may be formed onto the surface using an additive manufacturing process. Alternatively, still, the protrusions 240, and component including the protrusions 240, may be formed in any other suitable manner.

Further, the protrusions may be non-resilient protrusions, such that they are configured to not appreciably deflect or deform during assembly of the fluid coupling assembly 200. For example, the protrusions 240 may be configured such that they do not lose more than ten percent (10%) of their height (e.g., relative to the surface on which they are positioned) during installation, such as not more than five percent (5%) of their height during installation. This may be contrasted to resilient protrusions, such as spring members or cantilevered extensions that are designed to substantially deflect during assembly.

Figure 3:
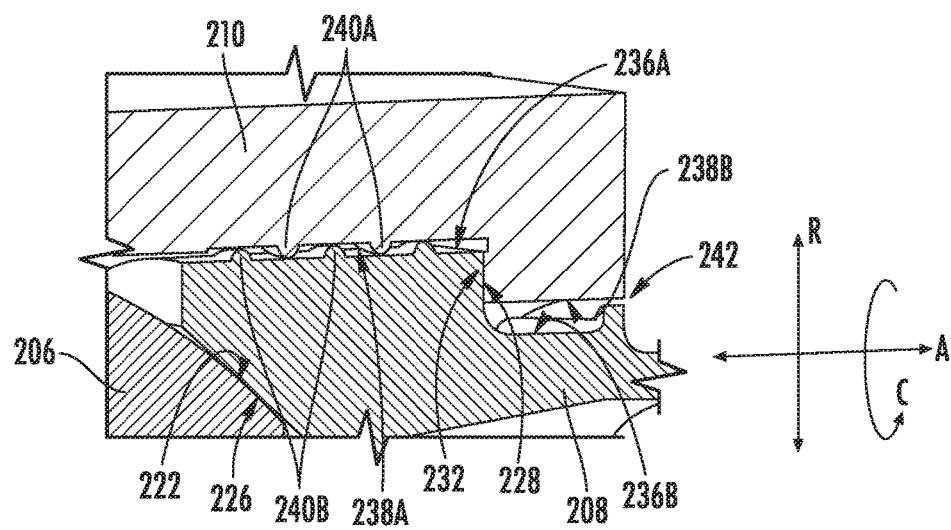
FIG. 3 is a close-up, perspective, cross-sectional view of a nut coupling and a ferrule coupling of the fluid coupling assembly of FIG. 2.

More specifically, still, referring now also to FIG. 3, providing a close-up, cross-sectional, perspective view of the inner surface 238 of the nut coupling 210 and outer surface 236 of the ferrule coupling 208, it will be appreciated that the plurality of protrusions 240 is a first plurality of protrusions 240A positioned on the inner surface 238 of the nut coupling 210, and that the first plurality of protrusions 240A contact the outer surface 236 of the ferrule coupling 208. Moreover, for the embodiment shown, it will be appreciated that the outer surface 236 of the ferrule coupling 208 includes a second plurality of protrusions 240B contacting the inner surface 238 of the nut coupling 210.

Briefly, it will be appreciated that for the embodiment shown, the plurality of protrusions 240, or rather, the first plurality of protrusions 240A and second plurality of protrusions 240B, are each a plurality of substantially symmetrical protrusions, and more specifically are each a plurality of semi-spherical protrusions. In such a manner, it will be appreciated that each of the protrusions 240A, 240B may generally have a rounded, semi-spherical shape. However, in other embodiments, one or more of the first plurality of protrusions 240A or second plurality of protrusions 240B may have any other suitable shape.

Moreover, referring now briefly to FIG. 4, providing a perspective view of a portion of the ferrule coupling 208, it will be appreciated that as noted above, the plurality of protrusions 240 are spaced generally along the circumferential direction C. More specifically, FIG. 4 depicts the second plurality of protrusions 240B on the outer surface 236 of the ferrule coupling 208. As will be appreciated, the second plurality of protrusions 240B may include any suitable number of individual protrusions 240B, such as at least five (5) protrusions 240B and up to one hundred (100) protrusions 240B. Specifically, for the embodiment shown, the second plurality protrusions 240B includes about twenty-four (24) protrusions 240. It will be appreciated, however, that in other embodiments, any other suitable number of protrusions may be included with the second plurality of protrusions 240B, and that the plurality of protrusions 240B may be arranged in any suitable pattern. Further, it will be appreciated that the first plurality of protrusions 240A may be configured in a similar manner to the second plurality of protrusions 240B depicted in FIG. 4, or alternatively, may have any other suitable configuration.

Inclusion of the first plurality of protrusions 240A on the inner surface 238 of the nut coupling 210 and contacting the outer surface 236 of the ferrule coupling 208, as well as the second plurality of protrusions 240B on the outer surface 236 of the ferrule coupling 208 contacting the inner surface 238 of the nut coupling 210, may increase a loosening resistance of the fluid coupling assembly 200 by creating additional resistance and friction force required to be overcome to rotate the nut coupling 210 relative to the male coupling 206 in a loosening direction. More specifically, by focusing the contact pressure between the two surfaces 236, 238 to the ends of the protrusions 240A, 240B, a kinetic friction force required to turn the nut coupling 210 relative to the ferrule coupling 208 (and male coupling 206) may be increased.

Referring back particularly to FIG. 2, it will be appreciated that in addition to the first and second pluralities of protrusions 240A, 240B, the fluid coupling assembly 200 further includes a secondary means for increasing a loosening resistance of the fluid coupling assembly 200. For the embodiment depicted, the secondary means for increasing the loosening resistance of the fluid coupling assembly 200 is a set of geometric members for engaging one another to resist the rotation of the nut coupling 210 relative to the male coupling 206 and ferrule coupling 208, therefore increasing the loosening resistance of the fluid coupling assembly 200. More specifically, for the embodiment shown, the geometric members are formed on/with aspects of at least two of the nut coupling 210, the male coupling 206, and the ferrule coupling 208 to form a serration assembly 242. As used herein, the term "geometric member" refers to any shape of protrusion extending from a surface, or cavity defined in the surface.

More specifically, still, for the embodiment shown, it will be appreciated that the outer surface 236 of the ferrule coupling 208 is a first outer surface 236A positioned on one side of the lip 228 along the axial direction A (i.e., forward of the lip 228) and that the ferrule coupling 208 further includes a second outer surface 236B positioned on an opposite side of the lip 228 along the axial direction A (i.e., aft of the lip 228). Similarly, the inner surface 238 of the nut coupling 210 is a first inner surface 238A positioned on one side of flange 232 along the axial direction A (i.e., forward of the flange 232) and the nut coupling 210 further includes a second inner surface 238B positioned on an opposite side of the flange 232 along the axial direction A (i.e., aft of the flange 232). The set of geometric members are an additional set of protrusions including, as will be explained in greater detail below, a first set of additional protrusions positioned on/formed with the second outer surface 236B of the ferrule coupling 208 and a second set of additional protrusions positioned on/formed with the second inner surface 238B of the nut coupling 210, the first and second sets of additional protrusions together forming the serration assembly 242.

Referring still to FIG. 2, it will be appreciated that for the embodiment shown, the NC attachment interface 230 defines a first length 244 along the axial direction A and the serration assembly 242 defines a second length 246 along the axial direction A. For the embodiment shown, the second length 246 of the serration assembly 242 is about twenty percent (20%) or less of the first length 244 of the NC attachment interface 230. More specifically, for the embodiment shown, the second length 246 is about ten percent (10%) or less of the first length 244. In such a manner, it will be appreciated that the serration assembly 242 may only engage when the nut coupling 210 is substantially fully engaged with the male coupling 206 through the second MC attachment interface 224 and NC attachment interface 230. In such a manner, the serration assembly 242 may act as a "full-engagement" indicator for the fluid coupling assembly 200, in addition to being a means for increasing a loosening resistance of the fluid coupling assembly 200.

Figure 6:
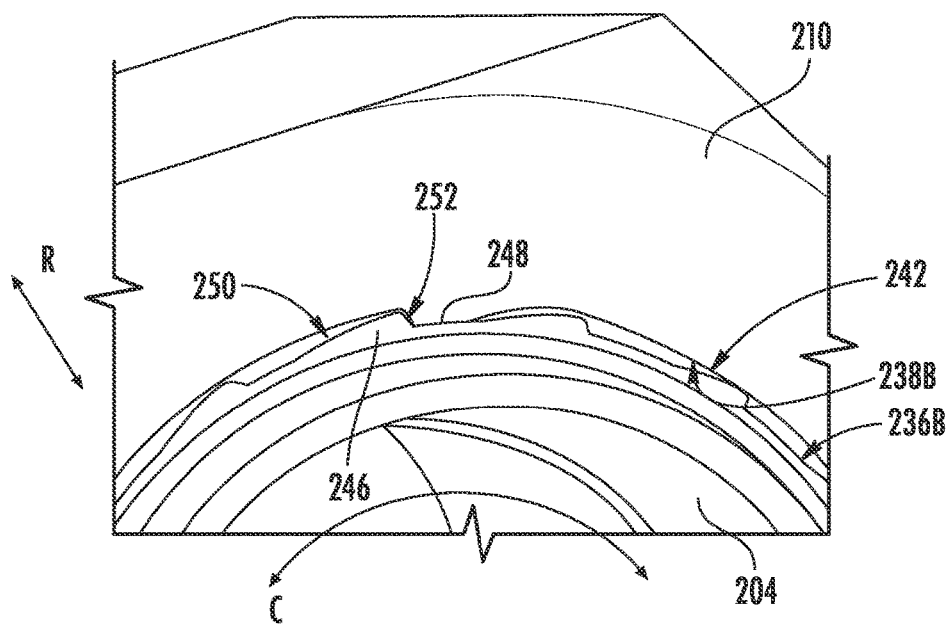
FIG. 6 is a close-up, perspective, end view of the nut coupling and fluid coupling assembly of FIG. 2.

Referring now to FIGS. 5 and 6, the serration assembly 242 will be described in more detail. FIG. 5 shows a perspective, partial view of the exemplary fluid coupling assembly 200 of FIG. 2, and FIG. 6 provides a close-up view of Circle 6-6 of FIG. 5.

As is depicted, for the embodiment shown the first set of additional protrusions is a first plurality of serration slopes 246 and the second set of additional protrusions is a second plurality of serration slopes 248, the first and second pluralities of serration slopes 246, 248 together forming the serration assembly 242. Moreover, for the embodiment depicted, the first plurality of serration slopes 246 is a continuous arrangement of serration slopes on the second outer surface 236B of the ferrule coupling 208, and the second plurality of serration slopes 248 is a plurality of intermittent serration slopes on the second inner surface 238B of the nut coupling 210, spaced along the circumferential direction C. For the embodiment shown, the second plurality of serration slopes 248 accordingly includes less serration slopes than the first plurality of serration slopes 246, and more specifically, includes between two and eight serration slopes. More specifically, still, for the embodiment shown, the second plurality of serration slopes 248 includes four serration slopes. However, in other embodiments, the second plurality of serration slopes 248 may include an equal number of slopes as the first plurality of serration slopes 246, or alternatively may include more serration slopes than the first plurality of serration slopes 246.

Referring particularly to FIG. 6, as will be appreciated, the serration assembly 242 is configured to resist a rotation of the nut coupling 210 relative to the male coupling 206 in a loosening circumferential direction C. More specifically, each serration slope generally includes a relatively gradual incline section 250 and a relatively steep incline section 252. When the nut coupling 210 is being rotated relative to the male coupling 206 in a tightening circumferential direction C, the relatively gradual incline sections 250 of opposing serration slopes of the serration assembly 242 contact each other, requiring a relatively small amount of torque to overcome the resistance generated thereby. By contrast, when the nut coupling 210 is being rotated relative to the male coupling 206 in a loosening circumferential direction C, the relatively steep incline sections 252 of opposing serration slopes of the serration assembly 242 contact each other, requiring a relatively high amount of torque to overcome the resistance generated thereby. In such a manner, the serration assembly 242 may further increase a loosening resistance of the fluid coupling assembly 200.

Notably, however, it will be appreciated that the serration assembly 242 depicted is provided by way of example only, and that in other embodiments, any other suitable serration assembly 242 may be provided. For example, in other embodiments, both the first plurality of serration slopes 246 and second plurality of serration slopes 248 may be continuously arranged along the circumferential direction C, or both may be intermittently arranged along the circumferential direction C. Further, although the serration assembly 242 is formed between the nut coupling 210 and the ferrule coupling 208 for the embodiment shown, in other embodiments, the serration assembly 242 may additionally, or alternatively, be formed between the nut coupling 210 and the male coupling 206 (e.g., at a location forward of the attachment interfaces 224, 226). Further, still, in other exemplary embodiments any other suitable geometry may be provided for the first and second pluralities of additional protrusions (for example, one or both of the first and second pluralities of additional protrusions may have any other suitable shape for engaging one another), or alternatively one or both of the sets of geometric members may not all be configured as protrusions and instead may include cavities defined in a surface configured to engage correspondingly shaped protrusions on an opposing surface.

Moreover, it will be appreciated that the fluid coupling assembly 200 described above with reference to FIGS. 1 through 6 is provided by way of example only. In other embodiments, any other suitable fluid coupling assembly 200 may be provided. For example, although for the embodiment shown the fluid coupling assembly 200 includes both the first and second pluralities of protrusions 240A, 240B, in other embodiments, the fluid coupling assembly 200 may only include one of the first plurality of protrusions 240A or the second plurality of protrusions 240B. Similarly, although for the embodiment shown the fluid coupling assembly 200 includes both the plurality of protrusions 240 and the "additional" pluralities of protrusions (i.e., the protrusions forming the serration assembly 242 for the embodiment depicted), in other embodiments, the fluid coupling assembly 200 may only include one of the plurality of protrusions 240 or additional protrusions/serration assembly 242.

Figure 7:
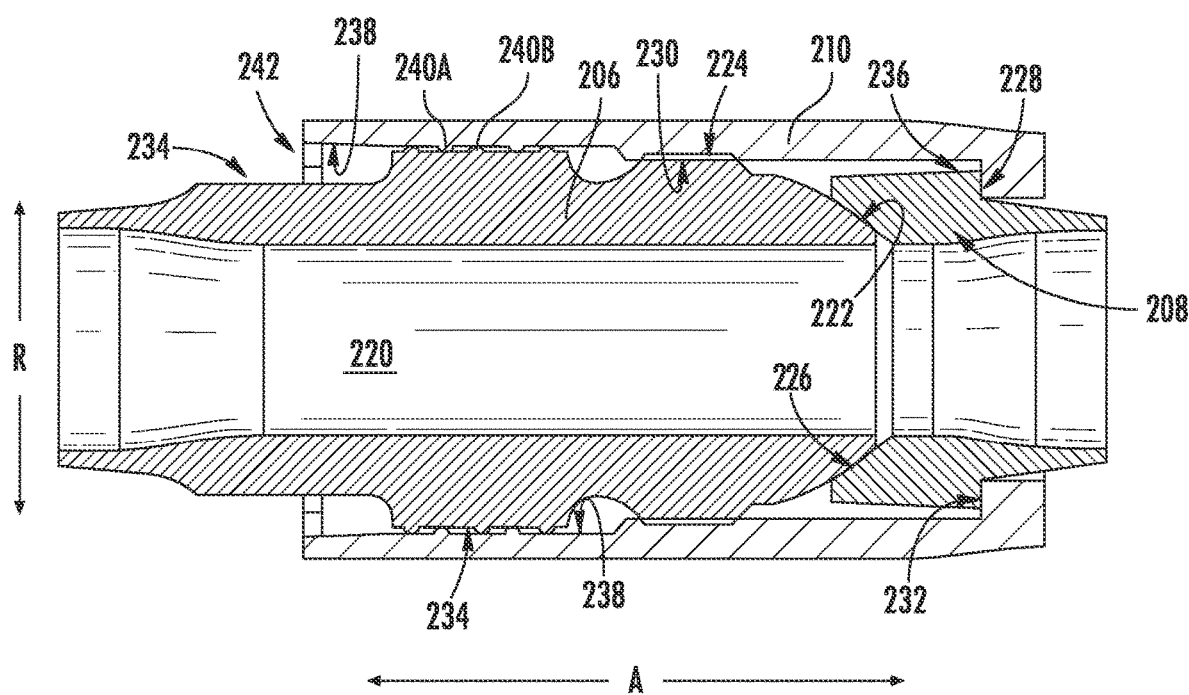
FIG. 7 is side, cross-sectional view of a fluid coupling assembly in accordance with another exemplary embodiment of the present disclosure.

Further, still, in other embodiments, any other suitable configuration may be provided for the plurality of protrusions 240, serration assembly 242, etc. For example, referring now to FIG. 7, a fluid coupling assembly 200 in accordance with another exemplary embodiment of the present disclosure is provided. FIG. 7 provides a side, cross-sectional view of the exemplary fluid coupling assembly 200. The exemplary fluid coupling assembly 200 depicted may be formed in substantially the same manner as the exemplary fluid coupling assembly 200 described above with reference to FIGS. 1 through 6, and accordingly, the same or similar numbers may refer to same or similar part.

For example, the exemplary fluid coupling assembly 200 of FIG. 7 generally includes a male coupling 206, a nut coupling 210, and a ferrule coupling 208. The male coupling 206 includes a first MC attachment interface 222 and a second MC attachment interface 224, the nut coupling 210 includes an NC attachment interface 230 and a flange 232, and the ferrule coupling 208 includes an FC attachment interface 226 and a lip 228. The first MC attachment interface 222 forms a fluid tight seal with the FC attachment interface 226, the second MC attachment interface 224 is rotatably engaged with the NC attachment interface 230, and the flange 232 of the nut coupling 210 is pressed against the lip 228 of the ferrule coupling 208.

In addition, the exemplary fluid coupling assembly 200 depicted in FIG. 7 includes a plurality of protrusions 240 on a surface of one of the components. More specifically, for the embodiment shown, the nut coupling 210 includes an inner surface 238 extending along the circumferential direction C to define a circular shape, the male coupling 206 similarly includes an outer surface 236 extending along the circumferential direction C to define a circular shape, and the plurality of protrusions 240 are on the inner surface 238 of the nut coupling 210 or the outer surface 234 of the male coupling 206. More specifically, still, for the embodiment shown, the plurality of protrusions is a first plurality of protrusions 240A on the inner surface 238 of the nut coupling 210, and the outer surface 234 of the male coupling 206 includes a second plurality of protrusions 240B. The first plurality of protrusions 240A contact the outer surface 234 of the male coupling 206 and the second plurality of protrusions 240B contact the inner surface 238 of the nut coupling 210. Further, by contrast to the embodiment shown above, for the embodiment depicted in FIG. 7, the inner surface 238 of the nut coupling 210 is located forward of the NC attachment interface 230 and is positioned adjacent to the outer surface 234 of the male coupling 206.

Moreover, for the embodiment depicted in FIG. 7, the fluid coupling assembly 200 includes serration assembly 242. However, the serration assembly 242 is not formed between the nut coupling 210 and the ferrule coupling 208, and instead is formed by and between the nut coupling 210 and the male coupling 206. More specifically, the serration assembly 242 is formed between the outer surface 234 of the male coupling 206 (at a location forward of the second MC attachment interface 224 and plurality of protrusions 240) and an inner surface 238 of the nut coupling 210 (at a location forward of the NC attachment interface 230 and plurality of protrusions 240).

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A fluid coupling assembly defining an axial direction, a radial direction, and a circumferential direction and comprising:
    a male coupling comprising a first male coupling attachment interface, a second male coupling attachment interface, and an outer surface extending along the circumferential direction;
    a ferrule coupling comprising a ferrule coupling attachment interface pressed against the first male coupling attachment interface, a lip extending along the radial direction, and an outer surface extending along the circumferential direction to define a circular shape; and
    a nut coupling comprising a nut coupling attachment interface rotatably engaged with the second male coupling attachment interface, a flange extending along the radial direction and pressed against the lip of the ferrule coupling, and an inner surface extending along the circumferential direction to define a circular shape;
    wherein the outer surface of the male coupling, the outer surface of the ferrule, or the inner surface of the nut coupling includes a plurality of non-resilient protrusions spaced along the circumferential direction for contacting an opposing surface and increasing a loosening resistance of the fluid coupling assembly, and
    wherein the plurality of non-resilient protrusions are positioned on the outer surface of the ferrule coupling and formed integrally with the outer surface of the ferrule coupling, and wherein the plurality of non-resilient protrusions are configured to contact the inner surface of the nut coupling, and/or the plurality of non-resilient protrusions are positioned on the inner surface of the nut coupling and formed integrally with the inner surface of the nut coupling, and wherein the plurality of non-resilient protrusions are configured to contact the outer surface of the ferrule coupling.

2. The fluid coupling assembly of claim 1, wherein the plurality of non-resilient protrusions is a plurality of substantially semi-spherical protrusions.

3. The fluid coupling assembly of claim 1, wherein the plurality of non-resilient protrusions is a first plurality protrusions, and wherein the outer surface of the ferrule coupling includes a second plurality of protrusions formed integrally with the outer surface of the ferrule coupling and contacting the inner surface of the nut coupling.

4. The fluid coupling assembly of claim 1, wherein the outer surface of the ferrule coupling is a first outer surface positioned on one side of the lip along the axial direction, wherein the ferrule coupling further comprises a second outer surface positioned on an opposite side of the lip along the axial direction, wherein the inner surface of the nut coupling is a first inner surface positioned on one side of the flange along the axial direction, wherein the nut coupling further comprises a second inner surface positioned on an opposite side of the flange along the axial direction, and wherein the second outer surface of the ferrule coupling and the second inner surface of the nut coupling together form a serration assembly.

5. The fluid coupling assembly of claim 4, wherein the second outer surface of the ferrule coupling comprises a first plurality of serration slopes, wherein the second inner surface of the nut coupling comprises a second plurality of serration slopes, and wherein the first plurality of serration slopes and the second plurality of serration slopes together form the serration assembly.

6. The fluid coupling assembly of claim 5, wherein the second plurality of serration slopes is a continuous arrangement of serration slopes, and wherein the first plurality of serration slopes is a plurality of intermittent serration slopes spaced along the circumferential direction.

7. The fluid coupling assembly of claim 4, wherein the nut coupling attachment interface defines a first length along the axial direction, wherein the serration assembly defines a second length along the axial direction, and wherein the second length is about 20 percent or less of the first length.

8. The fluid coupling assembly of claim 1, wherein the first male coupling attachment interface is an inwardly sloping surface, and wherein the ferrule coupling attachment interface is an outwardly sloping surface.

9. The fluid coupling assembly of claim 1, wherein the plurality of non-resilient protrusions includes at least five protrusions and up to 100 protrusions.

10. The fluid coupling assembly of claim 1, wherein the male coupling, the ferrule coupling, or the nut coupling is formed through an additive manufacturing process to include the plurality of non-resilient protrusions.

11. A fluid coupling assembly defining an axial direction, a radial direction, and a circumferential direction and comprising:
a male coupling comprising a first male coupling attachment interface, a second male coupling attachment interface, and an outer surface extending along the circumferential direction;
a ferrule coupling comprising a ferrule coupling attachment interface pressed against the first male coupling attachment interface, a lip extending along the radial direction, and an outer surface extending along the circumferential direction to define a circular shape; and
a nut coupling comprising a nut coupling attachment interface rotatably engaged with the second male coupling attachment interface, a flange extending along the radial direction and pressed against the lip of the ferrule coupling, and an inner surface extending along the circumferential direction to define a circular shape;
wherein the outer surface of the male coupling, the outer surface of the ferrule, or the inner surface of the nut coupling includes a plurality of non-resilient protrusions spaced along the circumferential direction for contacting an opposing surface and increasing a loosening resistance of the fluid coupling assembly, and
wherein the plurality of non-resilient protrusions are positioned on at least one of the outer surface of the male coupling and the inner surface of the nut coupling, and wherein the outer surface of the male coupling is positioned adjacent to the inner surface of the nut coupling, and wherein the plurality of non-resilient protrusions are configured to directly contact at least one of the outer surface of the male coupling and the inner surface of the nut coupling.

12. The fluid coupling assembly of claim 11, wherein the nut coupling attachment interface includes a plurality of threads, and wherein the second male coupling attachment interface includes a corresponding plurality of threads.

13. A fluid coupling assembly defining an axial direction, a radial direction, and a circumferential direction and comprising:
a male coupling comprising a first male coupling attachment interface, a second male coupling attachment interface, and an outer surface extending along the circumferential direction;
a ferrule coupling comprising a ferrule coupling attachment interface pressed against the first male coupling attachment interface, a lip extending along the radial direction, and an outer surface extending along the circumferential direction; and
a nut coupling comprising a nut coupling attachment interface rotatably engaged with the second male coupling attachment interface, a flange extending along the radial direction and pressed against the lip of the ferrule coupling, an inner surface, and a first plurality of non-resilient geometric members formed on the inner surface and spaced along the circumferential direction;
wherein the outer surface of the male coupling or the outer surface of the ferrule includes a second plurality of non-resilient geometric members spaced along the circumferential direction for engaging a first plurality of protrusions and increasing a loosening resistance of the fluid coupling assembly.

14. The fluid coupling assembly of claim 13, wherein the first plurality of non-resilient geometric members is a first plurality of serration slopes, wherein the second plurality of non-resilient geometric members is a second plurality of serration slopes, and wherein the first plurality of serration slopes and the second plurality of serration slopes together form a serration assembly.

15. The fluid coupling assembly of claim 14, wherein the second plurality of serration slopes is a continuous arrangement of serration slopes, and wherein the first plurality of serration slopes is a plurality of intermittent serration slopes spaced along the circumferential direction.

16. The fluid coupling assembly of claim 14, wherein the nut coupling attachment interface defines a first length along the axial direction, wherein the serration assembly defines a second length along the axial direction, and wherein the second length is about 20 percent or less of the first length.

17. The fluid coupling assembly of claim 13, wherein the first plurality of non-resilient geometric members is a plurality of substantially semi-spherical protrusions, and wherein the second plurality of non-resilient geometric members is also a plurality of substantially semi-spherical protrusions.

18. An aeronautical gas turbine engine comprising:
a system utilizing a fluid, the system comprising a fluid coupling assembly for connecting a pair of fluid lines, the fluid coupling assembly defining an axial direction, a radial direction, and a circumferential direction and comprising:
a male coupling comprising a first male coupling attachment interface, a second male coupling attachment interface, and an outer surface extending along the circumferential direction;
a ferrule coupling comprising a ferrule coupling attachment interface pressed against the first male coupling attachment interface, a lip extending along the radial direction, and an outer surface extending along the circumferential direction to define a circular shape; and a nut coupling comprising a nut coupling attachment interface rotatably engaged with the second male coupling attachment interface, a flange extending along the radial direction and pressed against the lip of the ferrule coupling, and an inner surface extending along the circumferential direction to define a circular shape;

wherein the outer surface of the male coupling, the outer surface of the ferrule, or the inner surface of the nut coupling includes a plurality of non-resilient protrusions spaced along the circumferential direction for directly contacting an opposing surface and increasing a loosening resistance of the fluid coupling assembly.

\* \* \* \* \*